United States Patent [19]

Jonsson

[11] 3,855,719

[45] Dec. 24, 1974

[54] METHOD AND A DEVICE IN CONNECTION WITH A REGENERATIVE DRIER FOR GAS UNDER OVERPRESSURE

[75] Inventor: Uno I. Jonsson, Spanga, Sweden

[73] Assignee: AB Carl Munters, Sollentuna, Sweden

[22] Filed: Mar. 5, 1973

[21] Appl. No.: 337,892

[30] Foreign Application Priority Data

Mar. 10, 1972 Sweden.............................. 3120/72

[52] U.S. Cl................................. 34/9, 34/71, 34/75
[51] Int. Cl............................................... F26b 3/00
[58] Field of Search.................. 34/9, 71, 80, 75, 95

[56] References Cited
UNITED STATES PATENTS 2,115,226   4/1938   Kopp................................ 34/1 UX 3,121,000   2/1964   Hubbard................................ 34/75

*Primary Examiner*—John J. Camby
*Attorney, Agent, or Firm*—Shlesinger, Fitzsimmons & Shlesinger

[57] ABSTRACT

Moist compressed air is fed into one sector of a rotor made of a hygroscopic material such as asbestos and having channels in it which are parallel to its axis. From the channels of this sector the air flows to a condenser and from the condenser the air flows through the channels of another sector of the rotor and out to its place of use. The channels of a third sector of the rotor are cooled by sucking air through them into a duct which conveys this air on to the condenser. The slowly rotating rotor causes air coming from the compressor to regenerate the channels of the rotor.

8 Claims, 7 Drawing Figures

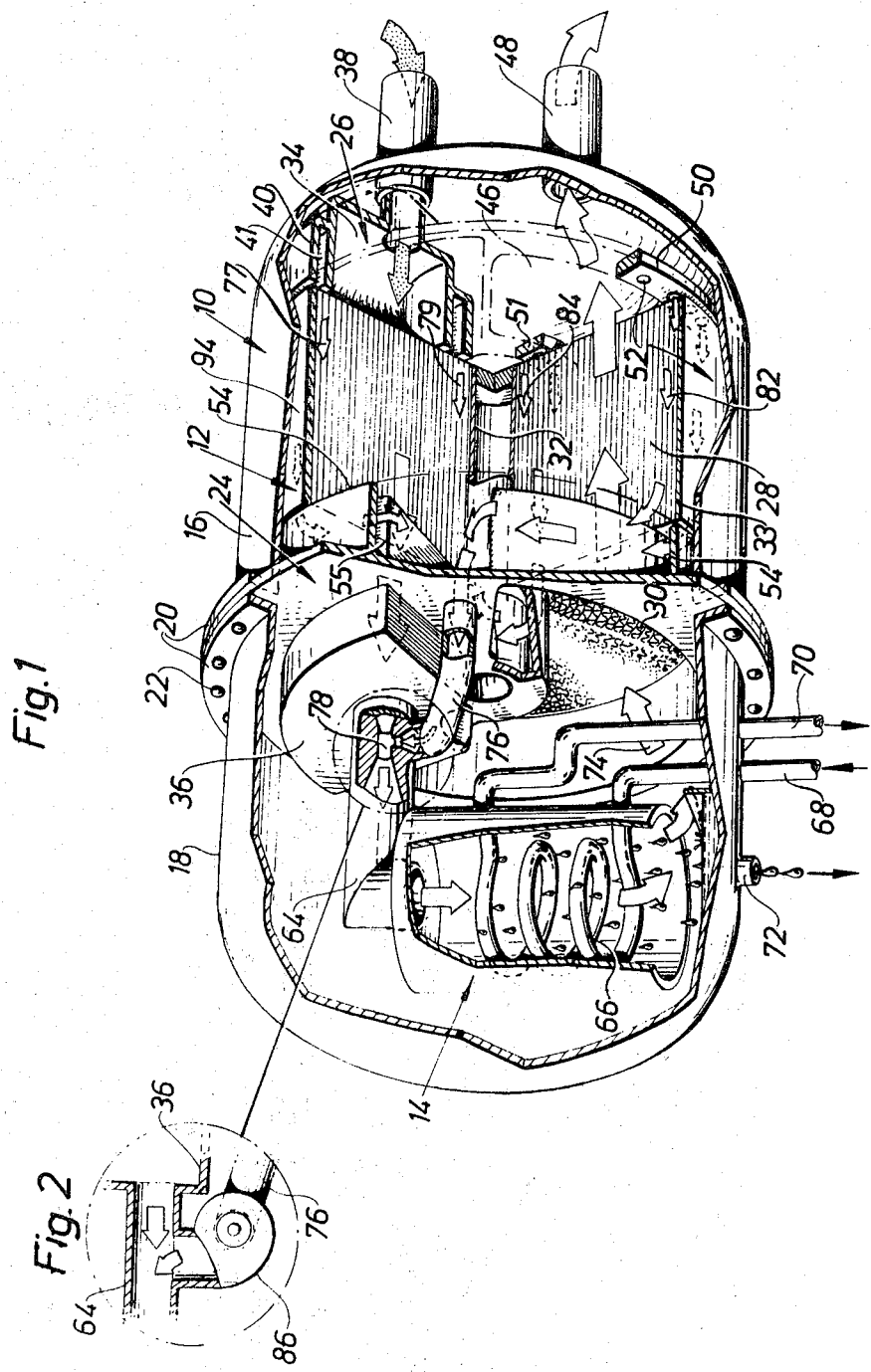

METHOD AND A DEVICE IN CONNECTION WITH A REGENERATIVE DRIER FOR GAS UNDER OVERPRESSURE

This invention refers to a method in connection with a regenerative drier intended for gas compressed to overpressure in a compressor unit and provided with a rotor in a housing, said rotor being composed of a substance with hygroscopic properties, forming through-passing channels and divided into a drying zone and a regenerating zone.

More exactly the invention refers to a method to regenerate the regenerating zone by means of the warm gas delivered by the compressor unit, said gas having a temperature over 100°, for example 150°. Said gas has a high absolute moisture content; but on the other hand the relative moisture content thereof is sufficiently low for performing a regenerating process. The invention is essentially characterized therein that essentially all the gas coming from the compressor is passed through the regenerating zone and then cooled and predried in a condenser before it passes through the drying zone for final drying.

According to the invention there is ensured that sufficiently large gas quantities pass the regenerating zone for achieving good drying of the rotor substance. By the fact that the pressure of the gas is higher in the regenerating zone than in the drying zone as consequence of inevitable flowing losses in the apparatus, an overflow of moist gas into the drying zone might take place and such an overflow may risk the intended drying effect. According to the invention this leakage air is returned to the warm, moist gas flow before it reaches the drying zone; and according to another characterizing property the leakage gas is drained to a third zone located between the regenerating and the drying zones at the side where the channels of the rotor substance leave the regenerating zone, in order to be sucked back to the main flow together with cooling gas passing through this third zone.

The invention also comprises apparatus particularly suited to perform said method; and in this apparatus said compressor unit, the regenerating zone of the rotor, a condenser, and the drying zone of the rotor communicate by pipes with each other so that they are passed through in the mentioned order by all or almost all the gas coming from the unit.

The invention is described in greater detail with reference to the accompanying drawings, which show, by way of examples, different embodiments; and then also other features characterizing the invention are indicated.

In the drawings;

FIG. 1 shows in perspective a drier built according to the invention with parts cut away for the sake of illustration;

FIG. 2 shows an alternative embodiment of an element;

In all the embodiments corresponding parts have been given the same designations.

Figure 3:
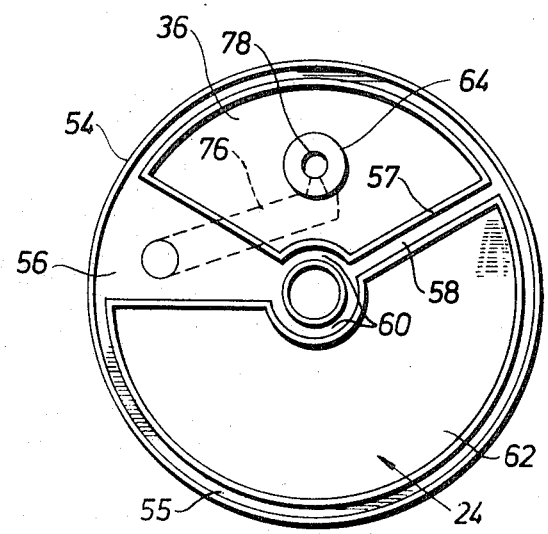
FIG. 3 shows schematically a side view of the left side of the rotor and FIG. 4 shows the spider or plate at the right side (FIG. 1) of the rotor, the views being in both cases from the intermediate rotor.

Referring to the drawings by numerals of reference, 10 designates a closed housing which in the right section thereof, according to FIG. 1, includes a drying rotor 12 and in the left section thereof a condenser 14. Said housing 10 comprises two cylindrical parts 16, 18 having cupped bottoms connected to each other by flanges 20 and bolts 22, a trough 24 then being fixed between said flanges. The rotor 12 is applied between the left closure or trough 24 and a right trough or closure 26 in FIG. 1, said closures separating three sector-shaped zones to effectuate the intended flowing paths through the rotor 12, as will be described in greater detail.

The rotor 12 is cylindrically shaped and has flat ends and includes a substance forming through-passing axial channels. The rotor is preferably built up by alternating flat and corrugated layers 28, 30 which are helically wound around the hub 32 of the rotor, the corrugations extending axially so that said rotor will have axially extending channels which are open to the closures but laterally separated from each other. The individual winding turns may be mutually connected by a binder, such as water glass.

The separation between the flat layers 28, being fixed by the folding height of the intermediate layers 30, can be less than 3 mm and preferably approximately 1.5 mm. Said layers consist of a material, such as asbestos, which is fibrous or porous and at the same time non-inflammable.

In order to give said rotor moisture-absorbing properties, said layers are covered or impregnated with a hygroscopic substance which can be wholly or partly a water-soluble salt, for example lithium chloride. To said asbestos layers there is also applied a deposit of a water-soluble substance, such as calcium silicate or silicum dioxide, to give them a good wet strength. Said layered substance may be enclosed by a special case 33, although this is not a requisite.

The rotor 12 is driven at a low number of revolutions per minute, as a few revolutions per hour, by means of a drive, not shown.

Figure 4:
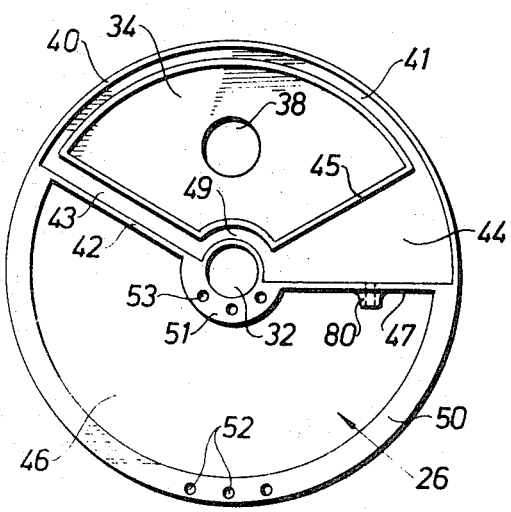

The closures 24, 26 include peripheral and radial walls forming sealing gaps against the rotor 12 whereby said rotor is divided into three zones, as is best seen in FIGS. 3 and 4. Of these, a regenerating zone occupies approximately 120° of the circumference and extends between a chamber 34 of the closure 26 and a chamber 36 of the closure 24. These two chambers are located at opposite ends of the rotor. Chamber 34 is connected to an inlet 38 for moist compressed air coming from the compressor unit (not shown). Said unit compresses ordinary air in two or more steps and performs the intermediate cooling in a condenser.

At the input of chamber 34 this air can have a pressure of 7 – 10 atmospheres and a temperature of approximately 150°.

The chamber 34 is limited by a ring-like wall element 40 (FIG. 4) forming a U-shaped groove 41 open to the rotor, said groove at one side changing into a U-shaped groove 43 formed in radial element 42. On the other side chamber 34 borders on a cooling sector 44 having a less peripheral extension, as 30°, between radial walls 45, 47. The groove 43 and the cooling sector 44 are mutually connected by a groove 49 extending part-way around hub 32. The rest of the circumference of the closure 26 is occupied by a drying zone 46 communicating with a drain 48 leading to the place of consumption for the dried compressed air or the useful air.

Strips 50 and 51, respectively, are located around the drying zone 46 at its outer and interior peripheries, said strips having perforations 52 and 53, respectively. The groove 41 of the ring-like element 40 and the perforations 52 of the strip 50 are located opposite to the outermost axial channels of the rotor 12 so that air can pass from said groove and said perforations, respectively, through these channels. In the same way said groove 49 and said perforations 53 are located opposite to the innermost axial channels of the rotor.

The closure 24 (FIG. 3) is limited radially outwards by a ring-like wall 54 extending all around the circumference and thus also around the cooling zone 56 of this closure. The wall element 54 forms a U-shaped groove 55 which is open to the rotor and which on one side of the regenerating zone 36 changes into a radial element 57 having a U-shaped groove 58. The cooling zone 56 and the groove 58 are connected to each other by a ring shaped groove 60 around the hub 32. The cooling sector 44 of the right closure 26 and the cooling sector 56 of the left closure 24 are located axially opposite to each other. The same applies to the drying sector 46 of closure 26 and the drying sector 62 of the closure 24.

When the incoming warm air flow has passed the regenerating zone of the rotor 12 it passes out of the rotor from the chamber 36 through a pipe 64 to the condenser 14. According to the embodiment illustrated said condenser takes the shape of a heat exchanger, that is the cooling medium and air are separated from each other. Thus, said cooler includes a schematically indicated pipe system 66 having an inlet 68 and an outlet 70 for cooling water which can be at a temperature of for example 5°–30° depending on climatical conditions. The condensate deposited from the compressed air in connection with this cooling is accumulated at the bottom part and passes out through a pipe 72 which can include a lock or a throttle in view of the difference of pressure relative to the surroundings.

In the condenser 14 the compressed air is cooled and at the same time dried to the lower moisture content. Then the air flows, according to arrow 74, into the drying sector 62 of the closure 24, which opens on the rotor, through said rotor, and the drying sector 46 of the right closure 26 and out through outlet 48 to the place of utilization.

In the regenerating zone the warm, compressed air takes up moisture from the rotor substance so that said substance is dried to low moisture content. Then the compressed air is predried in the condenser 14 and the final drying takes place during the passage through the rotor 12 in the drying zone thereof. Thus, the main quantity or all the air coming from the compressor unit is used as a regenerating medium.

The cooling sector of the rotor which registers with the sectors 44 and 56 of the closures is located between the two main zones at that side where the substance of the rotor during rotation leaves the regenerating zone. During regeneration the rotor substance has been heated up to the temperature of the regeneration air. The object of the cooling sector then is to remove the accumulated heat so that the same will not pass over to the dried useful air.

To this end the cooling sector 56 of the closure 24 is connected via a pipe 76 to an ejector 78 which is located in the pipe 64 and which therefore is passed by the main quantity of the compressed air flowing between the regenerating zone and the condenser 14. By the sucking effect of this ejector the pressure in the cooling sector 56 and at the same time in the corresponding cooling zone of the rotor 12, as well as in the cooling sector 44 in the closure 26, will be lower than in the drying zone and above all lower than in the regenerating zone. Via a throttle opening 80 (FIG. 4) the cooling sector 44 communicates with the drying zone 46 in which the dried useful air is collected before it passes out through the outlet 48. By this a weighed quantity of dried compressed air can pass through the cooling zone of the rotor substance so that the same will be cooled.

During the passage of the compressed air through the drier there will naturally occur pressure losses and therefore the pressure becomes lower in the drying zone than in the regenerating zone. Leakage of the moist compressed air from the regenerating zone into the drying zone is prevented by the fact that the drying zone is surrounded on both sides of the rotor 12 by the grooves arranged in the closures. These grooves communicate with the cooling zone in which the lowest pressure exists and the leakage is sucked out by the ejector 78 and returns to the main flow of compressed air in front of the condenser 14.

The compressed air leaking out from the regenerating zone at the inlet side can also flow axially from the peripheral grooves 41 and 49 and through the outermost and innermost channels of the rotor 12, registering with the same, according to arrows 77, 79 to the corresponding grooves 55, 60 of the closure 24, whereafter said air will pass out through the cooling sector 56. The corresponding channels of the rotor 12 are subjected to drying when they pass through the drying zone during rotation. Thus, a flow of dry air is provided through the channels, as indicated by arrows 82, 84 (FIG. 1), to those grooves 55, 60 (FIG. 3) of the closure 24 communicating with the cooling sector 56. Due to the fact that the strips 50 and 51 (FIG. 4) of the closure 26 include perforations 52, 53 over a limited area, the flow of dried useful air can be controlled to an appropriate amount.

In the functioning of the apparatus all the compressed air coming from the drier is fed to the regenerating zone. This compressed air can have a pressure of, for example, 7 atmospheres, a temperature of 150°, and a relative moisture content of 5 – 10 percent or lower. The rotor substance, which during the drying step has taken up moisture from the compressed air, is regenerated during the paasage of the compressed air through the regenerating zone. Then the compressed air flows further on to the condenser 14 where it is cooled down towards the temperature of the cooling water, the condensate at the same time depositing in the pipe system 66. In the drying zone a final drying of the compressed air will then take place; whereafter said air passes out through the outlet 48 to the place of utilization.

The embodiment according to FIG. 2 distinguishes from the preceding one only by the fact that the underpressure of the cooling sector is not produced by an ejector but by a blower 86 the suction side of which communicates with the pipe 76 coming from the cooling zone 56 and the pressure side of which ends in the pipe 64. The blower 86 produces the intended underpressure in the cooling zone.

Figure 5:
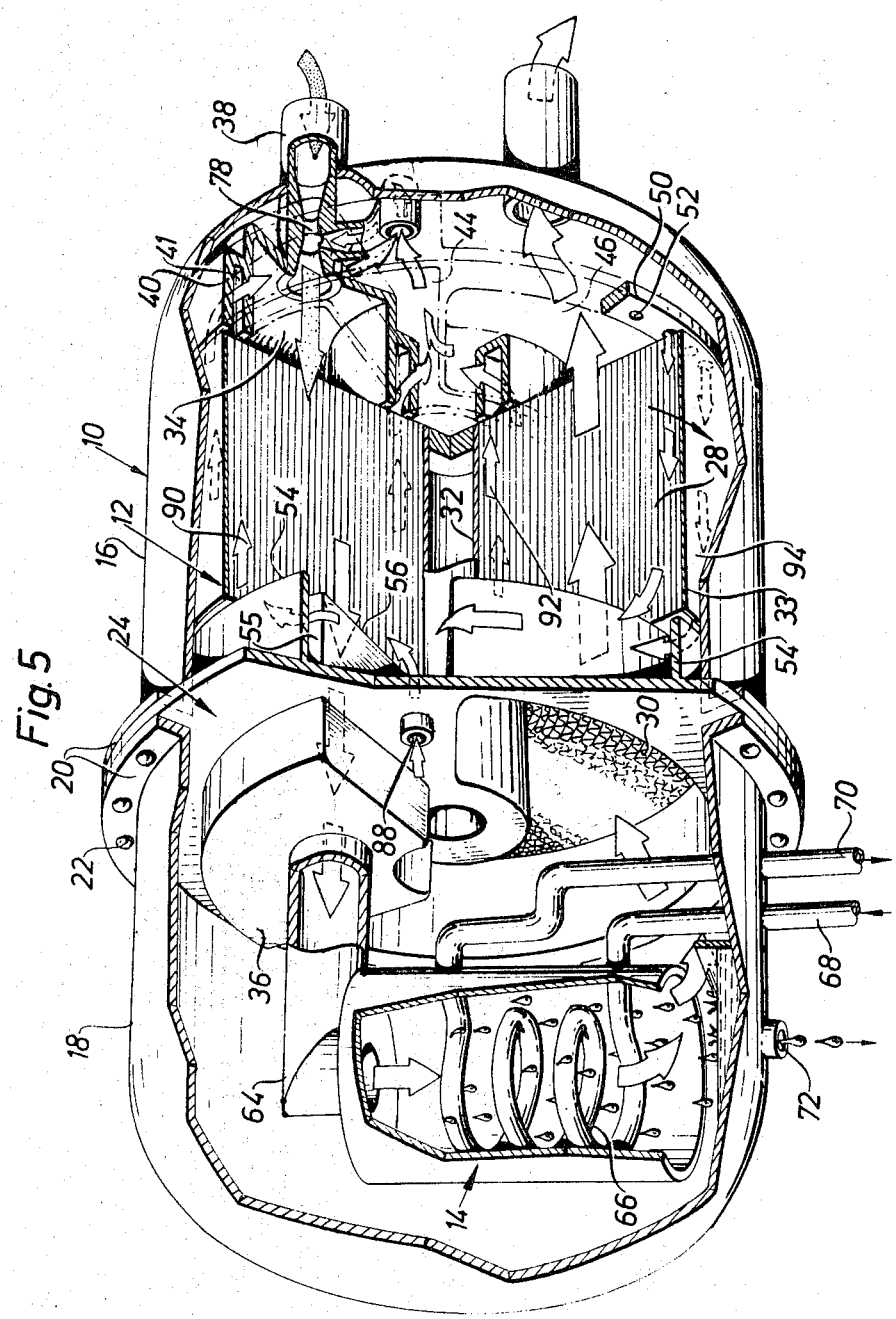
FIG. 5 shows a further embodiment of the invention in perspective and with parts cut away.
Figure 6:
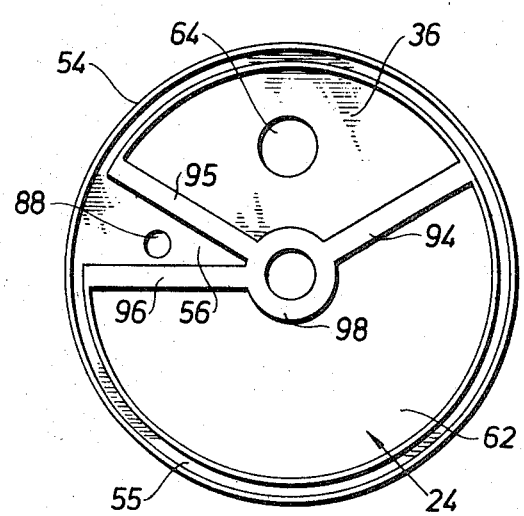
FIGS. 6 and 7 show the spiders of this embodiment and are like the same views of FIGS. 3 and 4.
Figure 7:
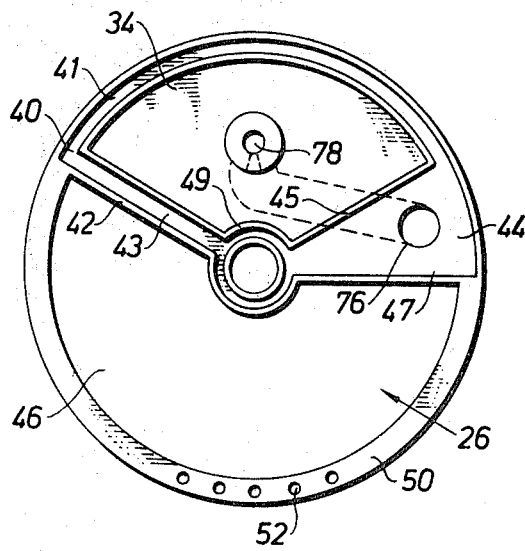

The embodiment according to FIGS. 5 – 7 distinguishes from the embodiment according to FIG. 1 by the fact that the ejector 78 is applied in the inlet pipe 38 for the warm compressed gas coming from the compressor unit, that is before said gas said the regenerating zone. This means that the pressure drop necessary for the function of the ejector is taken outside the apparatus, and because of this the pressure difference within the same will be lower than in the preceding case. The cooling sector 56 is passed by air which earlier has only been subjected to drying in the condenser 14. This air is taken in through a controllable throttle 88 of the cooling sector 56 of the left closure 24. The cooling sector 44 of the right closure 26 communicates with the ejector 78 merely by the pipe 76. In this case the flow of leakage air to the U-shaped grooves 41, 43 and 49 will take place in the opposite direction, as compared to that mentioned before, as indicated by arrows 90, 92. The groove 49 extends over the total circumference at the hub, as is particularly disclosed in FIG. 7. In this case the regenerating sector 36 and the cooling sector 56 of the left closure can be limited radially and at the hub by flat strip seals 94–96 and 98 relative to the flat side of the rotor 12.

In the two embodiments described above the drying zone 46 freely communicates with the gap 94 between the rotor 12 and the cylindric housing part 16, so that said rotor is surrounded by dry air.

It is to be understood that the invention is not limited to the embodiments shown but may be expressed in a number of other embodiments all within the scope of the basic concept. Thus, said condenser 14 may advantageously include a contact body in which the compressed gas and water can be brought in direct contact with each other, for example in counterflow.

Having thus described my invention, what I claim is:

1. A method of using a regenerative drier for treating a hot gas compressed in a compressor unit, comprising, rotatably mounting a rotor in a housing, said rotor being composed of a substance with hygroscopic properties, and having therethrough a plurality of axially extending channels, dividing the space occupied by said rotor into a drying zone and a regenerating zone, each of which zones includes a different group of said channels in said rotor, and causing substantially all the hot gas coming from the compressor first to pass axially through the rotor channels in said regenerating zone to remove moisture therefrom, and then to be cooled and predried in a condenser before passing through the rotor channels in said drying zone for final drying.

2. A method according to claim 1, including causing any gas, which leaks from the regenerating zone in consequence of the higher pressure prevailing therein, to be drained to a third zone located between the two firstmentioned zones at that discharge ends of the rotor channels in the regenerating zone, and, causing the last-mentioned gas to be sucked back to the main flow of gas at one end of said regenerating zone, together with cooling gas passing into this third zone from said drying zone.

3. A method according to claim 2, wherein said leakage and cooling gas is returned to the main flow of gas by means of an ejector, and using the hot compressor gas, before it has been fed into the condenser, to drive said ejector.

4. A method according to claim 2, including providing said cooling gas by taking it from the main flow of gas from the compressor after said flow of gas has passed the condenser.

5. A method according to claim 3, wherein the hot compressor gas is used to drive the ejector after the gas has passed through the regenerating zone rather than before passing therethrough.

6. A method according to claim 4, wherein part of said cooling gas is taken from the main flow of gas after said flow of gas has passed said drying zone.

7. A regenerative drier device for treating a hot, compressed gas from a compressor, comprising a housing having an inlet and an outlet, a rotor rotatably mounted in said housing and having therethrough a plurality of axially extending channels, and being composed of a substance having hygroscopic properties, means in said housing dividing the space occupied by said rotor into a regenerating zone containing certain of the channels in said rotor, and drying zone containing certain others of said channels, a condenser in said housing, and means for conveying substantially all the hot gas from said compressor successively from said inlet through the rotor channels in said regenerating zone, said condenser, and the rotor channels in said drying zone to said outlet.

8. A regenerative dryer device as defined in claim 7, including means defining a cooling zone at one end of said rotor between said regenerating and said drying zones, ejector means connecting said cooling zone to said conveying means, whereby the flow of hot gas in said conveying means draws gas from said cooling zone to lower the pressure therein to a value less than in the other two zones, and means connecting said cooling zone to the edges of said regenerating zone to collect any hot gases escaping therefrom.

* * * * *